United States Patent [19]

Bubeck et al.

[11] Patent Number: 5,356,584
[45] Date of Patent: Oct. 18, 1994

[54] POLYBENZAZOLE FIBERS WITH ULTRA-HIGH PHYSICAL PROPERTIES AND METHOD FOR MAKING THEM

[75] Inventors: Robert A. Bubeck; Chieh-Chun Chau, both of Midland; Stephen J. Nolan, Saginaw; Steven Rosenberg, Midland; Mark D. Newsham, Midland; Myrna Serrano, Midland, all of Mich.

[73] Assignee: The Dow Chemical Company, Midland, Mich.

[21] Appl. No.: 152,547

[22] Filed: Nov. 15, 1993

Related U.S. Application Data

[62] Division of Ser. No. 985,060, Dec. 3, 1992, Pat. No. 5,286,833.

[51] Int. Cl.⁵ .................. D01D 5/04; D01D 10/02
[52] U.S. Cl. ................ 264/205; 264/211.12; 264/211.13; 264/211.19; 264/210.8; 528/183; 528/321; 528/337; 528/342
[58] Field of Search ............... 264/205, 211.8, 211.12, 264/211.13, 211.19; 528/183, 321, 337, 342

[56] References Cited

U.S. PATENT DOCUMENTS

| | | |
|---|---|---|
| 4,533,693 | 8/1985 | Wolfe et al. |
| 5,286,833 | 2/1994 | Bubeck et al. ............ 528/183 |
| 5,296,185 | 3/1994 | Chau et al. ............ 264/205 |

Primary Examiner—Morton Foelak

[57] ABSTRACT

A process for making PBZ fibers of ultra-high physical properties is given. Polybenzoxazole fibers made by the process of this invention have tensile strengths nearly double in value from what has been reported previously.

2 Claims, No Drawings

POLYBENZAZOLE FIBERS WITH ULTRA-HIGH PHYSICAL PROPERTIES AND METHOD FOR MAKING THEM

CROSS-REFERENCE TO RELATED APPLICATIONS

This application is a divisional of co-pending application Ser. No. 07/985,060 filed Dec. 3, 1992 now U.S. Pat. No. 5,286,833.

BACKGROUND OF THE INVENTION

This invention relates to polybenzazole ("PBZ") fibers and processes for making them.

Polybenzazole fibers are known to have good physical properties such as tensile strength (750 ksi (1 ksi=1000 psi (pounds per square inch)) and tensile modulus (43 msi (1 msi=1,000,000 psi) (heat-treated fiber)). It is known to spin polybenzazole fibers from solutions of PBZ in various solvents (see Encyclopedia of Polymer Science and Technology, Vol. 11, pp. 601–635). Coagulating PBZ fibers in cold temperatures is known to slightly enhance tensile properties of the fibers (U.S. Pat. No. 3,767,756). It is also known to slightly increase the tensile properties of spun PBO fiber by coagulating the fiber in a mixture of acid and water vs. coagulating the fiber in water alone. (Synthesis, Spinning, and Fiber Mechanical Properties of Poly(p-phenylenebenzobisoxazole) by Choe and Kim Macromolecules, Vol. 14, 1981, pp. 920–924.)

PBZ fibers with ultra-high physical properties and a spinning process for creating them are needed to meet certain needs of the marketplace.

SUMMARY OF THE INVENTION

One aspect of the current invention is a process for preparing a polybenzazole fiber with ultra-high physical properties comprising the steps of:

(a) spinning a lyotropic liquid-crystalline polybenzazole polymer dope that contains polybenzazole polymer and a solvent through a spinneret to create a dope fiber;

(b) drawing the dope fiber across an air gap; and (c) removing a major part of the solvent from the dope fiber; under conditions such that the dope fiber in the air gap is clear.

The second aspect of the present invention is a polybenzazole fiber with a tensile strength of at least 1,000 ksi.

A third aspect of the present invention is a polybenzazole fiber with a tensile modulus of at least 50 msi.

DETAILED DESCRIPTION OF THE INVENTION

The present invention uses shaped articles containing polybenzazole (polybenzoxazole and polybenzothiazole) polymers. Polybenzoxazole, polybenzothiazole and random, sequential and block copolymers of polybenzoxazole and polybenzothiazole are described in references such as Wolfe et al., Liquid Crystalline Polymer Compositions, Process and Products, U.S. Pat. No. 4,703,103 (Oct. 27, 1987); Wolfe et al., Liquid Crystalline Polymer Compositions, Process and Products, U.S. Pat. No. 4,533,692 (Aug. 6, 1985); Wolfe et al., Liquid Crystalline poly(2,6-Benzothiazole) Compositions, Process and Products, U.S. Pat. No. 4,533,724 (Aug. 6, 1985); Wolfe, Liquid Crystalline Polymer Compositions, Process and Products, U.S. Pat. No. 4,533,693 (Aug. 6, 1985); Evers, Thermooxidatively Stable Articulated p-Benzobisoxazole and p-Benzobisthiazole Polymers, U.S. Pat. No. 4,359,567 (Nov. 16, 1982); Tsai et al., Method for Making Heterocyclic Block Copolymer, U.S. Pat. No. 4,578,432 (Mar. 25, 1986); 11 Ency. Poly. Sci. Eng., Polybenzothiazoles and Polybenzoxazoles, 601 (J. Wiley & Sons 1988) and W. W. Adams et al., The Materials Science and Engineering of Rigid-Rod Polymers (Materials Research Society 1989), which are incorporated herein by reference.

The polymer may contain AB-mer units, as represented in Formula 1(a), and/or AA/BB-mer units, as represented in Formula 1(b)

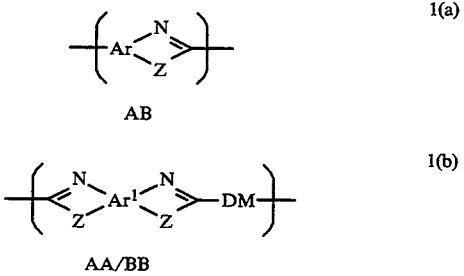

wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bisphenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (At) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra, at 602, which is incorporated herein by reference.

The polymer preferably consists essentially of either AB-polybenzazole mer units or AA/BB-polybenzazole mer units, and more preferably consists essentially of AA/BB-polybenzazole mer units. The molecular structure of the polybenzazole polymer may be rigid rod, semi-rigid rod or flexible coil. It is preferably rigid rod in the case of an AA/BB-polybenzazole polymer or semi-rigid in the case of an AB-polybenzazole polymer.

Azole rings within the polymer are preferably oxazole rings (Z=0). Units within the polybenzazole polymer are preferably chosen so that the polymer is lyotropic liquid-crystalline, which means it forms liquid-crystalline domains in solution when its concentration exceeds a "critical concentration point." Preferred mer units are illustrated in Formulae 2(a)–(h). The polymer more preferably consists essentially of mer units selected from those illustrated in 2(a)–(h), and most preferably consists essentially of a number of identical units selected from those illustrated in 2(a)–(c).

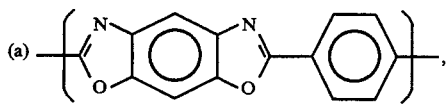

cis-polybenzoxazole
Poly[benzo(1,2-d:5,4-d')bisoxazole-2,6-diyl-1,4-phenylene]

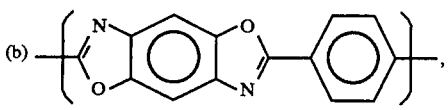

trans-polybenzoxazole
Poly[benzo(1,2-d:4,5-d')bisoxazole-2,6-diyl-1,4-phenylene]

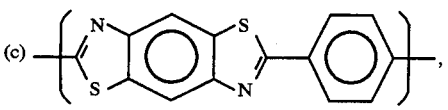

trans-polybenzothiazole

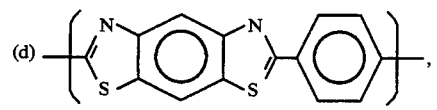

cis-polybenzothiazole

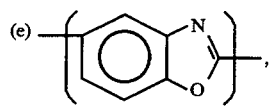

AB—PBO
Poly(2,5-benzoxazole)

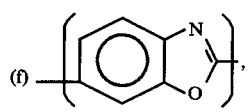

AB—PBO
Poly(2,6-benzoxazole)

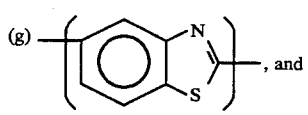

, and

Poly(2,5-benzothiazole)

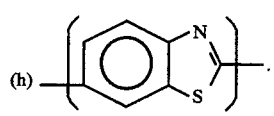

Poly(2,6-benzothiazole)

Each polymer preferably contains on average at least about 25 mer units, more preferably at least about 50 mer units and most preferably at least about 100 mer units. The intrinsic viscosity of lyotropic liquid-crystalline AA/BB-polybenzazole polymers (as estimated by a single-point method in methanesulfonic acid at 25° C.) is preferably at least about 10 deciliters/gram ("dL/g"), more preferably at least about 15 dL/g, and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 45 dL/g. The intrinsic viscosity is most preferably about 33 dL/g. The intrinsic viscosity of lyotropic liquid-crystalline, semi-rigid AB-polybenzazole polymers is preferably at least about 5 dL/g, more preferably at least about 10 dL/g and most preferably at least about 15 dL/g.

The polymer is fabricated into fibers and films by spinning or extruding from a dope. A dope is a solution of polymer in a solvent. If freshly made polymer or copolymer is not available for spinning or extruding, then previously-made polymer or copolymer can be dissolved in a solvent to form a solution or dope. Some polybenzoxazole and polybenzothiazole polymers are soluble in cresol, but the solvent is preferably an acid capable of dissolving the polymer. The acid is preferably non-oxidizing. Examples of suitable acids include: polyphosphoric acid, methanesulfonic acid, sulfuric acid and mixtures of those acids. The acid is preferably polyphosphoric acid and/or methanesulfonic acid, and is more preferably polyphosphoric acid.

The dope should contain a high enough concentration of polymer for the polymer to coagulate to form a solid article but not such a high concentration that the viscosity of the dope is unmanageable to handle. When the polymer is rigid or semi-rigid, then the concentration of polymer in the dope is preferably high enough to provide a liquid crystalline dope. The concentration of the polymer is preferably at least about 7 weight percent, more preferably at least about 10 weight percent and most preferably at least about 14 weight percent. The maximum concentration is limited primarily by practical factors, such as polymer solubility and, as already described, dope viscosity. Because of these limiting factors, the concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985); Sybert et al., U.S. Pat. No. 4,772,678 (Sep. 20, 1988); Harris, U.S. Pat. No. 4,847,350 (Jul. 11, 1989); and Ledbetter et al., "An Integrated laboratory Process for Preparing Rigid Rod Fibers from The Monomers," *The Materials Science and Engineering of Rigid-Rod Polymers* at 253–64 (Materials Res. Soc. 1989), which are incorporated herein by reference. In summary, suitable monomers (AA-monomers and BB-monomers or AB-monomers) are reacted in a solution of non-oxidizing and dehydrating acid under a non-oxidizing atmosphere with vigorous mixing and high shear at a temperature that is increased in step-wise or ramped fashion from a starting temperature of no more than about 120°

C. to a final temperature of at least about 190° C. Examples of suitable AA-monomers include terephthalic acid and analogs thereof. Examples of suitable BB-monomers include 4,6-diaminoresorcinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

Spinning Fibers

In order to make polybenzazole fibers, the polybenzazole dopes are spun through a spinneret into an air-gap to make dope fibers. The dope fibers are drawn across the air gap. The solvent is removed from the drawn fibers, preferably by contacting the drawn fibers with a fluid that is not a solvent for the polymer. If desired, the as-spun fibers are then heat set to improve their tensile modulus.

To optimize the tensile and compressive properties of the fibers, one and possibly two (for high modulus fibers) conditions of clarity must be met. The first condition is that the extruded dope (uncoagulated) fiber must be optically clear when it is in the air gap. As defined herein, "clear" for an extruded dope fiber means that the edge of the capillary die behind the extruded dope fiber is readily observable through the actual dope fiber. A long distance microscope, such as a Questar TM long distance microscope or its equivalent can be used to observe whether the extruded dope fiber is clear. In this desirable "clear" condition, the dope fiber has only an amber-colored tint visible. A fiber with non-optimal tensile and/or compressive properties will have a characteristic "opaque" appearance when the fiber is in the extruded dope fiber stage. This undesirable "opaque" condition in an extruded dope fiber can be readily observed in that the dope fiber has a characteristic greenish-yellow color. This greenish-yellow color is easily seen with the naked eye. The opaque condition permits very little or no light transmission through the fiber when the fiber is viewed with a long distance microscope.

If the modulus properties of the fiber are to be as high as possible, the fiber must be heat set. The second condition of clarity that must be met (the first being clarity of the extruded dope fibers) in order to produce a fiber with optimal modulus properties is that the fiber must be clear after it has been heat set. Clarity of a heat-set fiber means that light transmission through the fiber is very easily perceived using a standard optical microscope. Clear heat-set fibers have been observed to have only a slight amber tint. Opaque condition of a heat-set fiber is apparent when the fiber has a mottled, blotchy, dark brown appearance under an optical microscope.

Process conditions to meet these criteria of clarity for producing fibers with optimal tensile and compressive properties are discussed in greater detail hereinafter.

The fiber may be spun from a monofilament or multi-filament line. An example of a useful monofilament fiber spinning line is shown on page 625 of a review article by J. F. Wolfe (see "Polybenzothiazoles and Polybenzoxazoles," *Encyclopedia of Polymer Science and Engineering*, 2nd ed., Vol. 11, pp. 601–635), which is incorporated herein by reference. The spinning equipment preferably contains a spinneret having one or more orifices and a means to impel the dope through the orifices. When the spinneret contains multiple orifices, the equipment preferably further contains a spin die to bring the dope to each orifice with about the same pressure and flow rate. The means to impel the dope may be, for instance, a pump, a piston or a single- or multiple-screw extruder. The orifice diameter is preferably between about 5 to 15 mils (0.005–0.015 inches), more preferably between about 7 and 9 mils and most preferably being 8 mils. The shear rate of the dope as it goes through the orifices is preferably between about 1500 to 5000 reciprocal seconds, more preferably in a range between about 1500 and 2000 reciprocal seconds and most preferably in a range of about 1700 reciprocal seconds.

TABLE 1

Spin Draw Ratio (SDR) vs. Average Attainable Monofilament Diameter (dia) at a Spinning Temperature of 150° C.

| | SDR | Diameter in Microns | Opaque (o), Transition (t), Clear (c) Appearance of Fiber |
|---|---|---|---|
| 1 | 0.4 | 38.5 | o |
| 2 | 1.1 | 49.0 | o |
| 3 | 2.2 | 40.6 | o |
| 4 | 3.7 | 44.4 | o |
| 5 | 4.3 | 32.7 | o |
| 6 | 4.6 | 29.3 | o |
| 7 | 5.0 | 20.0 | o |
| 8 | 6.9 | 23.6 | o |
| 9 | 8.4 | 25.6 | o |
| 10 | 10.2 | 20.8 | t |
| 11 | 10.5 | 21.4 | t |
| 12 | 11.4 | 24.1 | t |
| 13 | 11.6 | 21.3 | t |
| 14 | 13.4 | 20.2 | t |
| 15 | 15.4 | 19.0 | c |
| 16 | 17.0 | 17.4 | c |
| 17 | 18.7 | 18.3 | c |
| 18 | 20.0 | 15.1 | c |
| 19 | 20.0 | 16.8 | c |
| 20 | 20.3 | 15.4 | c |
| 21 | 20.6 | 16.3 | c |
| 22 | 25.7 | 15.0 | c |
| 23 | 38.9 | 13.9 | c |

In preparation for fiber spinning runs, the barrel is preheated and allowed to equilibrate, preferably for at least one hour. Fibers can be spun over a temperature range of between about 100° C. and about 220° C. with this range yielding fibers with a diameter variation of plus or minus 15 percent. The preferred temperature range is between about 110° C. and about 170° C. and the most preferred spinning temperature is about 110° C.

A dope fiber is formed by forcing the polybenzazole dope through a spinneret. The extruded dope fiber is drawn across a space known as an "air gap." The gas in the "air gap" may be air, but it may also be another gas such as nitrogen, carbon dioxide, helium or argon. The temperature in the air gap is preferably between about 0° C. and 100° C.

The spin draw ratio (SDR) is the ratio of the take-up velocity of the fiber divided by the extrusion velocity of the dope. The SDR range is between about 10 and 60. The preferred SDR range is between 15 and 50 and the most preferred SDR range is between 15 and 20.

Coagulation is the broad term used to define the separation of the polymer from its solvent. Once spun, the dope fiber must have the majority of its solvent removed either in a coagulation or washing bath or spray. Any coagulation or washing bath/spray used can contain water or water/acid mixtures, with the preferred acid being phosphoric acid at a concentration of 30 percent or less. Other coagulants/washing media for the fiber include organic solvents such as acetone, methanol or acetonitrile.

After the fiber is washed it is dried. Drying of PBZ fiber is described in co-owned, co-pending U.S. patent application Ser. No. 08/142,526 (filed Nov. 2, 1993), which is a continuation-in-part of now abandoned U.S. patent application No. 07/929,272 (filed Dec. 3, 1992). U.S. patent application Ser. No. 08/142,526 is incorporated by reference for details on drying conditions required in order to produce fiber with minimal damage.

If desired, the modulus of the fiber can be increased by heat treating the fiber. Heat treating (or heat setting as it is sometimes described) takes place preferably through a furnace that contains an inert gas such as nitrogen. Tension is placed on the fiber as it goes through the heat setting element. Heat setting can take place at any temperature between 300° C. and 600° C. with a preferred temperature range of between 400° C. and 550° C. and the most preferred temperature being 450° C. The residence time for heat setting depends upon the temperature, with the hotter the temperature the less time required. The range for residence time is preferably from 1 to 30 seconds.

Fibers spun under these conditions range in final (meaning after the fiber has been heat treated) diameter from 12 microns to 35 microns. It was found that a combination of SDR and certain diameter of fiber created (see Table I in Example I) yielded extruded dope fibers that were either opaque or clear and that the higher the SDR the lower the diameter of the fiber and the more chance that the extruded dope fibers would be clear. As stated previously, clarity in the extruded dope fiber was found to be crucial in obtaining fibers with enhanced physical properties. Clarity is believed to be an indication of "high" or "enhanced" molecular ordering.

Physical Properties and Measurement

Once the fiber has been heat set, it has its properties measured in the following manner:

Tensile Properties

Tensile properties are obtained for monofilament samples by first mounting the samples on cardboard tabs with a one-inch sample (gauge) length. After the average diameter of the filament sample is determined, the sample is tensile tested using an Instron ™ model 4201 fitted with air actuated grips and a crosshead speed of approximately 0.02 inch/min. The average tensile strength of the fibers is preferably at least about 600 ksi, highly preferably at least about 800 ksi, more highly preferably at least about 1000 ksi, most highly preferably at least about 1200 ksi and utmost highly preferably at least about 1600 ksi. The average tensile modulus of the fibers is preferably at least about 40 msi, more preferably at least about 50 msi and most preferably at least about 57 msi.

It has been found that for a given final monofilament diameter, tensile properties increased with decreasing spinning temperature. This is related in part to the increasing melt tension experienced with decreasing temperature. Sufficiently high melt tension is manifested by clarity in the extruded dope fiber appearance.

The maximum tensile properties for fiber were obtained when the fiber is spun at a temperature of 110° C.

Compressive Properties

Compressive properties of monofilament can be evaluated by three techniques. They are: 3-point compressive modulus measurements, recoil testing and single fiber composite compression testing. For this work, the 3-point compressive modulus test is used. The 3-point compressive modulus measurements reported in Example 1 are performed on monofilaments as per the technique described by Moalli (J. E. Moalli and F. J. McGarry, MIT Report R90-4 September 1990). The average compressive strength is preferably at least about 25 ksi and more preferably at least about 55 ksi. The average compressive modulus is preferably at most about 6,000,000 psi and more preferably at most about 30,000,000 psi.

Illustrative Examples

The following Examples are for illustrative purposes only. They should not be taken as limiting either the Specification or the claims. Unless stated otherwise, all parts and percentages are by weight.

Example 1

Several 14 weight percent dope samples containing cis-polybenzoxazole in polyphosphoric acid are obtained (PBO/PPA dope). These PBO/PPA dope samples have an intrinsic viscosity of between 22 dL/g to 44 dL/g with an intrinsic viscosity preferably of approximately 33 dL/g. Once formed these PBO/PPA dope samples are stored in a nitrogen-purged glove box.

In preparation for fiber spinning runs, a monofilament rheometer barrel is preheated to 150° C., 110° C. or 100° C. and allowed to equilibrate for at least one hour. The 14 percent PBO/PPA dopes are quickly inserted into the barrel. For the examples given here, PBO fiber is extruded at 150° C., 110° C. or 100° C. through a 0.008 inch die (L/D=2) with a shear rate of 1700 reciprocal seconds and spin-draw ratio range of 10 to 60. The take-up speed is about 35 meters/minute. These processing parameters resulted in monofilaments ranging in diameter from 35 μm down to 12 μm. Fiber is coagulated in approximately 1.5 liters of water, and transferred to a wash bath or subsequent staging baths. The fiber remained in the wash bath (H$_2$O) for approximately 12 hours (overnight), it was then run through a nitrogen-purged tube furnace with a heating element set at 450° C. with a residence time of about 10 seconds. Constant tension of 20 to 30 cN was maintained on the fiber during heat setting. The resulting diameter as a function of SDR is listed in Table 1 (the fibers described in this table were spun at 150° C.). It should be noted that under the conditions of the example, the extruded dope fiber was found to have an opaque to clear transition above a SDR of about 10, and is completely clear at a SDR equal to 15 or higher.

Tensile and Compressive Properties are given for the monofilaments so created in this work in Tables 2–4.

TABLE 2

| Fiber Diameter and Monofilament Tensile Modulus at Three Different Spinning Temperatures | | | | |
|---|---|---|---|---|
| Fiber Diameter in Microns | Tensile Modulus (msi) T = 100° C.* | Tensile Modulus (msi) T = 110° C. | Tensile Modulus (msi) T = 150° C. | Opaque (o), Transition (t), Clear (c) Appearance of Fiber |
| 1 | 29.16 | 33.0 | | | o |
| 2 | 31.36 | 31.5 | | | o |

TABLE 2-continued

Fiber Diameter and Monofilament Tensile Modulus at Three Different Spinning Temperatures

| | Fiber Diameter in Microns | Tensile Modulus (msi) T = 100° C.* | Tensile Modulus (msi) T = 110° C. | Tensile Modulus (msi) T = 150° C. | Opaque (o), Transition (t), Clear (c) Appearance of Fiber |
|---|---|---|---|---|---|
| 3 | 38.44 | 20.0 | | | o |
| 4 | 40.96 | 17.5 | | | o |
| 5 | 43.56 | 15.8 | | | o |
| 6 | 49.0 | 12.9 | | | o |
| 7 | 50.41 | 11.9 | | | o |
| 8 | 16.0 | | 55.7 | | c |
| 9 | 16.81 | | 47.4 | | c |
| 10 | 17.64 | | 48.8 | | c |
| 11 | 20.25 | | 38.7 | | c |
| 12 | 24.01 | | 25.8 | | o |
| 13 | 25.0 | | 24.0 | | o |
| 14 | 29.16 | | 21.1 | | o |
| 15 | 31.36 | | 16.7 | | o |
| 16 | 31.36 | | 18.7 | | o |
| 17 | 12.96 | | | 32.0 | c |
| 18 | 12.96 | | | 35.1 | c |
| 19 | 13.69 | | | 31.7 | c |
| 20 | 13.69 | | | 32.6 | c |
| 21 | 14.44 | | | 28.4 | c |
| 22 | 14.44 | | | 28.6 | c |
| 23 | 15.21 | | | 27.6 | c |

*At this low processing temperature, the very high viscosity of the dope fiber extrudate precluded orientating the dope fiber sufficiently to obtain clarity/optimal properties.

TABLE 3

Fiber Diameter and Monofilament Tensile Strength at Three Different Spinning Temperatures

| | Diameter in Microns | Tensile Strength (ksi) T = 100° C.* | Tensile Strength (ksi) T = 110° C. | Tensile Strength (ksi) T = 150° C. | Opaque (o), Transition (t), Clear (c) Appearance of Fiber |
|---|---|---|---|---|---|
| 1 | 29.16 | 925 | | | o |
| 2 | 31.36 | 793 | | | o |
| 3 | 38.44 | 602 | | | o |
| 4 | 40.96 | 468 | | | o |
| 5 | 43.56 | 518 | | | o |
| 6 | 49.0 | 417 | | | o |
| 7 | 50.41 | 337 | | | o |
| 8 | 16.0 | | 1563 | | c |
| 9 | 16.81 | | 1178 | | c |
| 10 | 17.64 | | 1257 | | c |
| 11 | 20.25 | | 1129 | | c |
| 12 | 24.01 | | 736 | | c |
| 13 | 25.0 | | 597 | | c |
| 14 | 29.16 | | 533 | | o |
| 15 | 31.36 | | 514 | | o |
| 16 | 31.36 | | 472 | | o |
| 17 | 12.96 | | | 701 | c |
| 18 | 12.96 | | | 709 | c |
| 19 | 13.69 | | | 520 | c |
| 20 | 13.69 | | | 527 | c |
| 21 | 13.69 | | | 576 | c |
| 22 | 14.44 | | | 407 | c |
| 23 | 14.44 | | | 552 | c |
| 24 | 15.21 | | | 434 | c |

*At this low processing temperature, the very high viscosity of the dope fiber extrudate precluded orienting the dope fiber sufficiently to obtain clarity even though post-extrusion drawing provides sufficient orientation to boost tensile properties slightly.

TABLE 4

Diameter of Fiber (microns) and Compressive Modulus (msi)

| | Diameter (microns) | Comp. Modulus (msi) | Clear (c) Transition (t), Opaque (o), Appearance of Fiber |
|---|---|---|---|
| 1 | 11.000 | 33.000 | c |
| 2 | 12.000 | 12.000 | c |
| 3 | 12.000 | 35.000 | c |
| 4 | 13.000 | 10.000 | c |
| 5 | 13.000 | 11.000 | t |
| 6 | 13.000 | 23.000 | c |
| 7 | 14.000 | 3.000 | t |
| 8 | 14.000 | 16.000 | c |
| 9 | 14.000 | 18.000 | c |
| 10 | 15.000 | 3.000 | t |
| 11 | 15.000 | 4.000 | t |
| 12 | 15.000 | 6.000 | t |
| 13 | 16.000 | 3.000 | o |
| 14 | 18.000 | 4.000 | o |
| 15 | 21.000 | 9.000 | t |
| 16 | 22.000 | 1.000 | o |
| 17 | 22.000 | 2.000 | o |
| 18 | 22.000 | 3.000 | o |
| 19 | 22.000 | 9.000 | t |
| 20 | 23.000 | 4.000 | o |
| 21 | 23.000 | 8.000 | o |
| 22 | 24.000 | 5.000 | o |
| 23 | 25.000 | 5.000 | o |
| 24 | 25.000 | 1.000 | o |
| 25 | 26.000 | 5.000 | o |
| 26 | 26.000 | 5.000 | o |
| 27 | 27.000 | 5.000 | o |
| 28 | 28.000 | 2.000 | o |
| 29 | 28.000 | 4.000 | o |
| 30 | 29.000 | 1.000 | o |
| 31 | 33.000 | 4.000 | o |

What is claimed is:

1. A process for preparing a polybenzazole fiber with ultra-high physical properties comprising the steps of:
   (a) spinning a lyotropic liquid-crystalline polybenzazole polymer dope that contains polybenzazole polymer and a solvent through a spinneret to create a dope fiber;
   (b) drawing the dope fiber across an air gap; and
   (c) removing a major part of the solvent from the dope fiber;
   under conditions such that the dope fiber in the air gap is clear.

2. The process of claim 1 with the additional step of heat setting the fiber under conditions such that the resulting heat set fiber is clear.

* * * * *